US008035252B2

(12) United States Patent
Ichikawa et al.

(10) Patent No.: US 8,035,252 B2
(45) Date of Patent: Oct. 11, 2011

(54) POWER SUPPLY SYSTEM, VEHICLE WITH THE SAME, TEMPERATURE INCREASE CONTROL METHOD FOR POWER STORAGE DEVICE AND COMPUTER-READABLE RECORDING MEDIUM BEARING PROGRAM FOR CAUSING COMPUTER TO EXECUTE TEMPERATURE INCREASE CONTROL OF POWER STORAGE DEVICE

(75) Inventors: Shinji Ichikawa, Toyota (JP); Tetsuhiro Ishikawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 323 days.

(21) Appl. No.: 12/310,240

(22) PCT Filed: Jul. 23, 2007

(86) PCT No.: PCT/JP2007/064828

§ 371 (c)(1), (2), (4) Date: Feb. 18, 2009

(87) PCT Pub. No.: WO2008/029564

PCT Pub. Date: Mar. 13, 2008

(65) Prior Publication Data

US 2009/0195067 A1 Aug. 6, 2009

(30) Foreign Application Priority Data

Sep. 4, 2006 (JP) ................................ 2006-239028

(51) Int. Cl.
*H02J 1/00* (2006.01)
*H02J 3/00* (2006.01)

(52) U.S. Cl. ........................................... 307/82; 307/46

(58) Field of Classification Search .................. 307/9.1, 307/45, 46, 82; 320/104, 150
See application file for complete search history.

(56) References Cited

U.S. PATENT DOCUMENTS 5,905,360 A 5/1999 Ukita
6,163,135 A 12/2000 Nakayama et al.
6,608,396 B2 * 8/2003 Downer et al. ............ 290/40 C
2003/0107352 A1 6/2003 Downer et al.

FOREIGN PATENT DOCUMENTS

JP A-8-017474 1/1996
JP A-10-066267 3/1998
JP A-2000-092614 3/2000
JP A-2003-102133 4/2003
JP A-2003-209969 7/2003
JP A-2004-015866 1/2004
JP A-2005-332777 12/2005
JP A-2006-121874 5/2006

OTHER PUBLICATIONS

May 17, 2011 Office Action issued in Japanese Patent Application No. 2006-239028 (with English Translation).

* cited by examiner

*Primary Examiner* — Jared Fureman
*Assistant Examiner* — Carlos Amaya
(74) *Attorney, Agent, or Firm* — Oliff & Berridge, PLC

(57) ABSTRACT

A power supply system includes power storage devices, converters and a converter ECU controlling the converters. In temperature increase control of power storage devices, converter ECU determines an electric power transferred between the power storage devices via a main positive bus line and a main negative bus line as well as a transfer direction of the electric power, based on an allowable discharge power and an allowable charge power of each power storage device, and controls the converters to transfer the determined electric power between the power storage devices.

12 Claims, 11 Drawing Sheets

100
3
34-1
MG1
36
38
34-2
MG2
30-1
INV 1
PWM1
32
DRIVE ECU
PWM2
30-2
INV 2
1
MPL
MNL
C
18
TR1, MRN1
TR2, MRN2
Ps
Vh
2
CONVERTER ECU
8-1
CONV 1
PWC1
PWC2
8-2
CONV 2
10-1
10-2
PL1
NL1
12-1
PL2
NL2
12-2
Ib1
SOC1
Tb1
SOC2
Tb2
Ib2
6-1
POWER STORAGE DEVICE 1
Vb1
BATTERY ECU
Vb2
6-2
POWER STORAGE DEVICE 2
14-1
Tb1
Tb2
4
14-2

44
Prq1,2
TARGET VALUE DETERMINING UNIT
50
CTL
P1
P2
Vb1
Vb2
÷
52-1
52-2
IR1
IR2
Ib1
Ib2
54-1
54-2
PI
56-1
56-2
Vb1/VR1
Vb2/VR2
58-1
58-2
Ton1
Ton2
MOD
60-1
60-2
PWC1
PWC2

POWER SUPPLY SYSTEM, VEHICLE WITH THE SAME, TEMPERATURE INCREASE CONTROL METHOD FOR POWER STORAGE DEVICE AND COMPUTER-READABLE RECORDING MEDIUM BEARING PROGRAM FOR CAUSING COMPUTER TO EXECUTE TEMPERATURE INCREASE CONTROL OF POWER STORAGE DEVICE

TECHNICAL FIELD

The invention relates to a control technique for increasing temperature of a power storage device included in a power supply system.

BACKGROUND ART

In recent years, vehicles such as a hybrid vehicle and an electric vehicle that are equipped with an electric motor as a power source have been improved to increase a capacity of a power storage unit for improving drive performance such as acceleration performance and a continuous travel distance. A structure having a plurality of power storage devices has been proposed as means for increasing the capacity of the power storage unit.

Japanese Patent Laying-Open No. 2003-209969 has disclosed a power supply control system provided with a plurality of power supply stages. This power supply control system includes a plurality of power supply stages that are connected in parallel together and supply a DC power to at least one inverter. Each power supply 6stage includes a battery and a boost/buck DC-DC converter.

In this power supply control system, the plurality of power supply stages are controlled to maintain an output voltage for the inverter by uniformly charging and discharging a plurality of batteries that are included in respective power supply stages.

Generally, in a power storage device such as a secondary battery and a capacitor, a capacity lowers with lowering of a temperature so that a charge/discharge property deteriorates with it. In the hybrid vehicle and others, therefore, it is desired to increase actively the temperature of the power storage device when the temperature of the power storage device is low after a vehicle system started. Particular, in the system having a plurality of power storage devices such as the power supply control system disclosed in aforementioned Japanese Patent Laying-Open No. 2003-209969, it is necessary to increase rapidly the temperature of the power storage device after the start of a vehicle system for sufficiently bringing out merits of the large capacity of power storage unit.

However, aforementioned Japanese Patent Laying-Open No. 2003-209969 has merely disclosed that the power storage device is operated to charge and discharge uniformly the plurality of batteries included in respective power supply stages, and has not particularly discussed a method for actively increasing the temperature of the plurality of power storage devices at a low temperature.

DISCLOSURE OF THE INVENTION

An object of the invention is to provide a power supply system having a power storage unit of which temperature can be actively increased as well as a vehicle provided with the power supply system.

Another object of the invention is to provide a temperature increase control method for actively increasing temperature of a power storage unit as well as a computer-readable recording medium that bears a program for causing a computer to perform the temperature increase control method.

According to the invention, a power supply system is capable of supplying an electric power to a load device, and includes first and second chargeable power storage devices, a power line, first and second converters, and a control device. The power line is configured to be capable of transferring an electric power between the power supply system and the load device. The first converter is provided between the first power storage device and the power line, and performs voltage conversion between the first power storage device and the power line. The second converter is provided between the second power storage device and the power line, and performs voltage conversion between the second power storage device and the power line. The control device controls the first and second converters. The control device determines the electric power transferred between the first and second power storage devices via the power line as well as a transfer direction of the electric power based on an allowable discharge power and an allowable charge power of each of the first and second power storage devices, and controls the first and second converters to transfer the determined electric power between the first and second power storage devices.

Preferably, the control device determines a maximum electric power transferable between the first and second power storage devices based on the allowable discharge power and the allowable charge power of each power storage device, and controls the first and second converters to transfer the determined maximum electric power between the first and second power storage devices.

Preferably, the control device determines the allowable discharge power and the allowable charge power of the first power storage device based on a state of charge and a temperature of the first power storage device, and determines the allowable discharge power and the allowable charge power of the second power storage device based on a state of charge and a temperature of the second power storage device.

Preferably, when supply of the electric power to the load device is required, the control device determines the electric power transferred between the first and second power storage devices as well as the transfer direction of the electric power based on the allowable discharge power and the allowable charge power as well as the required electric power of the load device.

According to the invention, a power supply system is capable of supplying an electric power to a load device, and includes first and second chargeable power storage devices, a power line, first and second converters, and a control device. The power line is configured to be capable of transferring an electric power between the power supply system and the load device. The first converter is provided between the first power storage device and the power line, and performs voltage conversion between the first power storage device and the power line. The second converter is provided between the second power storage device and the power line, and performs voltage conversion between the second power storage device and the power line. The control device controls the first and second converters. The control device determines a transfer direction of the electric power transferred between the first and second power storage devices via the power line based on a heating value during discharging and a heating value during charging of each of the first and second power storage devices, and controls the first and second converters to transfer the electric power between the first and second power storage devices in the determined transfer direction.

Preferably, the control device determines the transfer direction to maximize a sum of the heating values of the first and second power storage devices.

Preferably, when a temperature of one of the first and second power storage devices is to be increased preferentially, the control device determines the transfer direction to maximize the heating value of the power storage device of which temperature is to be increased preferentially, based on the heating value during the discharging and the heating value during the charging of the power storage device of which temperature is to be increased preferentially.

Further, according to the invention, a power supply system is capable of supplying an electric power to a load device, and includes first and second chargeable power storage devices, a power line, first and second converters, and a control device. The power line is configured to be capable of transferring an electric power between the power supply system and the load device. The first converter is provided between the first power storage device and the power line, and performs voltage conversion between the first power storage device and the power line. The second converter is provided between the second power storage device and the power line, and performs voltage conversion between the second power storage device and the power line. The control device controls the first and second converters. The control device calculates a state of charge that maximizes the electric power mutually transferred between the first and second power storage devices within a range of the achievable state of the charge of the first and second power storage devices determined based on a total quantity of the stored powers of the first and second power storage devices, and controls the first and second converters to transfer, between the first and second power storage devices, the electric power in the direction approaching the calculated state of the charge.

According to the invention, a vehicle includes any one of the aforementioned power supply systems, and a drive power generating unit receiving an electric power from the power supply system and generating a drive power of the vehicle.

Further, the invention provides a temperature increase control method for a power storage device in a power supply system capable of supplying an electric power to a load device. The power supply system includes first and second chargeable power storage devices, a power line, first and second converters, and a control device. The power line is configured to be capable of transferring an electric power between the power supply system and the load device. The first converter is provided between the first power storage device and the power line, and performs voltage conversion between the first power storage device and the power line. The second converter is provided between the second power storage device and the power line, and performs voltage conversion between the second power storage device and the power line. The temperature increase control method includes a step of determining the electric power transferred between the first and second power storage devices via the power line as well as a transfer direction of the electric power based on an allowable discharge power and an allowable charge power of each of the first and second power storage devices; and a step of controlling the first and second converters to transfer the determined electric power between the first and second power storage devices.

Further, the invention provides a temperature increase control method for a power storage device in a power supply system capable of supplying an electric power to a load device. The power supply system includes first and second chargeable power storage devices, a power line, first and second converters, and a control device. The power line is configured to be capable of transferring an electric power between the power supply system and the load device. The first converter is provided between the first power storage device and the power line, and performs voltage conversion between the first power storage device and the power line. The second converter is provided between the second power storage device and the power line, and performs voltage conversion between the second power storage device and the power line. The temperature increase control method includes a step of determining a transfer direction of the electric power transferred between the first and second power storage devices via the power line based on a heating value during discharging and a heating value during charging of each of the first and second power storage devices; and a step of controlling the first and second converters to transfer the electric power between the first and second power storage devices in the determined transfer direction.

Further, the invention provides a temperature increase control method for a power storage device in a power supply system capable of supplying an electric power to a load device. The power supply system includes first and second chargeable power storage devices, a power line, first and second converters, and a control device. The power line is configured to be capable of transferring an electric power between the power supply system and the load device. The first converter is provided between the first power storage device and the power line, and performs voltage conversion between the first power storage device and the power line. The second converter is provided between the second power storage device and the power line, and performs voltage conversion between the second power storage device and the power line. The temperature increase control method includes a step of calculating a total quantity of the stored powers of the first and second power storage devices; a step of calculating a state of charge that maximizes the electric power mutually transferred between the first and second power storage devices within a range of the achievable state of the charge of the first and second power storage devices determined based on the calculated total quantity of the stored powers; and a step of controlling the first and second converters to transfer, between the first and second power storage devices, the electric power in the direction approaching the calculated state of the charge.

Further, according to the invention, a computer-readable recording medium bears a program for causing a computer to execute any one of the aforementioned temperature increase control methods.

According to the invention, the first converter is provided between the first power storage device and the power line, and the second converter is provided between the second power storage device and the power line. The control device determines the electric power transferred between the first and second power storage devices via the power line as well as the transfer direction of the electric power based on the allowable discharge power and the allowable charge power of each of the first and second power storage devices, and controls the first and second converters to transfer the determined electric power between the first and second power storage devices. Therefore, the electric power is transferred between the first and second power storage devices within a range of the allowable discharge power or the allowable charge power of each power storage device, and the temperature of each power storage device increases according to the charge/discharge.

According to the invention, therefore, the temperatures of the first and second power storage devices can be actively increased. Consequently, a desired drive performance can be ensured early after the start of the vehicle system even when the temperature was low.

Also, according to the invention, the control device determines a transfer direction of the electric power transferred between the first and second power storage devices via the power line based on a heating value during discharging and a heating value during charging of each of the first and second power storage devices, and controls the first and second converters to transfer the electric power between the first and second power storage devices in the determined transfer direction. Therefore, the heat generation caused in each power storage device by the charge/discharge can be managed while transferring the power between the power storage devices.

According to the invention, therefore, the temperatures of the first and second power storage devices can be actively increased, and the state of temperature increase of each power storage device can be managed. Consequently, the desired drive performance can be ensured early after the start of the vehicle system.

Further, according to the invention, the control device calculates the state of charge that maximizes the electric power mutually transferred between the first and second power storage devices within the range of the achievable state of the charge of the first and second power storage devices determined based on the total quantity of the stored powers of the first and second power storage devices, and controls the first and second converters to transfer, between the first and second power storage devices, the electric power in the direction approaching the calculated state of the charge. Therefore, the charge/discharge of each power storage device is controlled to approach the state of charge maximizing the electric power mutually transferred between the first and second power storage devices.

According to the invention, therefore, the temperatures of the first and second power storage devices can be actively and rapidly increased. Consequently, the desired drive performance can be ensured early after the start of the vehicle system even when the temperature was low.

BEST MODES FOR CARRYING OUT THE INVENTION

Embodiments of the invention will be described below with reference to the drawings. In the figures, the same or corresponding components bear the same reference numbers, and description thereof is not repeated.

First Embodiment

Figure 1:
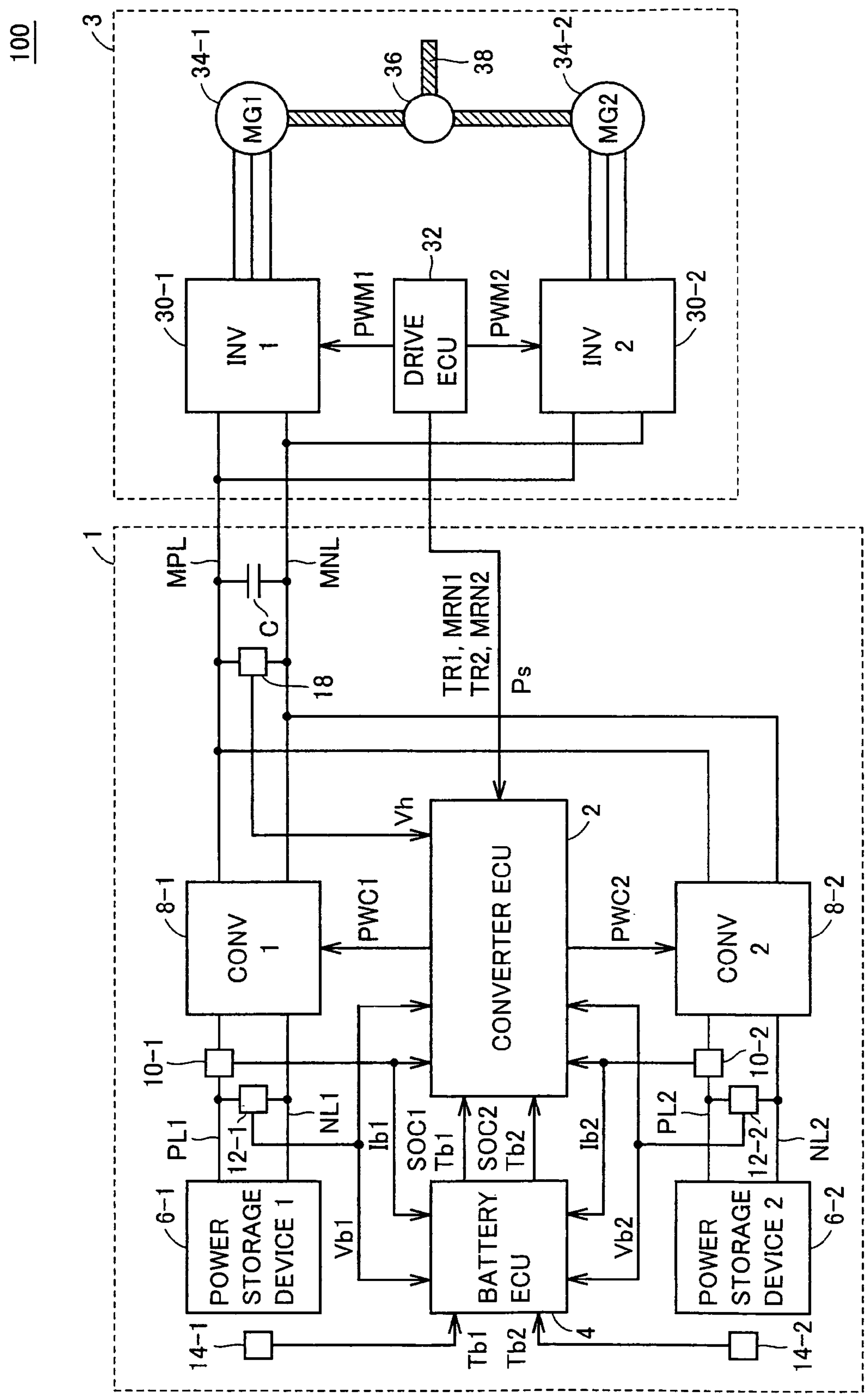
FIG. 1 is an overall block diagram of a vehicle according to a first embodiment of the invention.

FIG. 1 is an overall block diagram showing a vehicle of a first embodiment of the invention. Referring to FIG. 1, a vehicle 100 includes a power supply system 1 and a drive power generating unit 3. Drive power generating unit 3 includes inverters 30-1 and 30-2, motor generators 34-1 and 34-2, a power transmission mechanism 36, a drive shaft 38 and a drive ECU (Electronic Control Unit) 32.

Inverters 30-1 and 30-2 are connected in parallel to a main positive bus line MPL and a main negative bus line MNL. Inverters 30-1 and 30-2 convert the drive powers (DC powers) supplied from power supply system 1 into AC powers, and provide them to motor generators 34-1 and 34-2, respectively. Inverters 30-1 and 30-2 convert the AC powers generated by motor generators 34-1 and 34-2 into DC powers, and provide them as regenerative powers to power supply system 1.

Each of inverters 30-1 and 30-2 is formed of, e.g., a bridge circuit including three-phase switching elements. Inverters 30-1 and 30-2 perform switching operations according to drive signals PWM1 and PWM2 provided from drive ECU 32, and thereby drive the corresponding motor generators, respectively.

Motor generators 34-1 and 34-2 receive the AC powers from inverters 30-1 and 30-2, and thereby generate the rotational drive powers, respectively. Motor generators 34-1 and 34-2 receive externally supplied rotational power, and thereby generate the AC powers. For example, each of motor generators 34-1 and 34-2 is formed of a three-phase AC rotary motor provided with a rotor having an embedded permanent magnet. Motor generators 34-1 and 34-2 are coupled to power transmission mechanism 36 for transmitting the rotational drive power to wheels (not shown) via drive shaft 38 coupled to power transmission mechanism 36.

In the case where drive power generating unit 3 is employed in the hybrid vehicle, motor generators 34-1 and 34-2 are also coupled to an engine (not shown) via power transmission mechanism 36 or drive shaft 38. Drive ECU 32 executes the control to achieve an optimum ratio between the drive power generated by the engine and the drive powers generated by motor generators 34-1 and 34-2. In this structure employed in the hybrid vehicle, one of motor generators 34-1 and 34-2 may be operated exclusively as an electric motor, and the other motor generator may be operated exclusively as a power generator.

Drive ECU 32 calculates a vehicle-required power Ps based on signals transmitted from various sensors (not shown), running conditions, an accelerator press-down degree and the like, and calculates torque target values TR1 and TR2 as well as revolution speed target values MRN1 and MRN2 of motor generators 34-1 and 34-2, based on calculated vehicle-required power Ps. Also, drive ECU 32 produces drive signals PWM1 and PWM2 to control inverters 30-1 and 30-2 such that the generated torques and revolution speeds of motor generators 34-1 and 34-2 may attain torque target values TR1 and TR2 and revolution speed target values MRN1 and MRN2, respectively. Further, drive ECU 32 provides torque target values TR1 and TR2, revolution speed target values MRN1 and MRN2, and vehicle-required power Ps thus calculated to a converter ECU 2 (to be described later) of power supply system 1.

Power supply system 1 includes power storage devices 6-1 and 6-2, converters 8-1 and 8-2, a smoothing capacitor C, converter ECU 2, a battery ECU 4, current sensors 10-1 and 10-2, voltage sensors 12-1, 12-2 and 18, and temperature sensors 14-1 and 14-2.

Power storage devices 6-1 and 6-2 are chargeable and dischargeable DC power supplies, and each are formed of a secondary battery such as a nickel hydrogen battery or a lithium ion battery. Power storage device 6-1 is connected to converter 8-1 via positive line PL1 and negative line NL1. Power storage device 6-2 is connected to converter 8-2 via positive line LP2 and negative line NL2. Power storage devices 6-1 and 6-2 may be formed of electrical double layer capacitors.

Converter 8-1 is provided between power storage device 6-1 and the pair of main positive bus line MPL and main negative bus line MNL, and performs the voltage conversion between power storage device 6-1 and the pair of main positive bus line MPL and main negative bus line MNL based on a drive signal PWC1 from converter ECU 2. Converter 8-2 is provided between power storage device 6-2 and the pair of main positive bus line MPL and main negative bus line MNL, and performs the voltage conversion between power storage device 6-2 and the pair of main positive bus line MPL and main negative bus line MNL based on a drive signal PWC2 from converter ECU 2.

Smoothing capacitor C is connected between main positive bus line MPL and main negative bus line MNL, and reduces power variation components included in main positive bus line MPL and main negative bus line MNL. Voltage sensor 18 senses a voltage Vh across main positive bus line MPL and main negative bus line MNL, and provides a result of the sensing to converter ECU 2.

Current sensors 10-1 and 10-2 sense currents of values Ib1 and Ib2 provided to/from power storage devices 6-1 and 6-2, respectively, and each provide a result of the sensing to converter ECU 2 and battery ECU 4. Current sensors 10-1 and 10-2 sense the currents (discharge currents) supplied from the corresponding power storage devices as positive values, and sense the currents (charge currents) supplied to the corresponding power storage devices as negative values. In the structure shown in the figure, current sensors 10-1 and 10-2 sense the current values of positive lines PL1 and PL2, respectively. However, current sensors 10-1 and 10-2 may sense the currents of negative lines NL1 and NL2, respectively.

Voltage sensors 12-1 and 12-2 sense voltage values Vb1 and Vb2 of power storage devices 6-1 and 6-2, respectively, and each provide a result of the sensing to converter ECU 2 and battery ECU 4. Temperature sensors 14-1 and 14-2 sense internal temperatures Tb1 and Tb2 of power storage devices 6-1 and 6-2, respectively, and provide results of the sensing to battery ECU 4.

Battery ECU 4 calculates a state quantity SOC1 that represents an SOC (State Of Charge) of power storage device 6-1, based on current value Ib1 from current sensor 10-1, voltage value Vb1 from voltage sensor 12-1 and temperature Tb1 from temperature sensor 14-1, and provides state quantity SOC1 thus calculated to converter ECU 2 together with temperature Tb1.

Battery ECU 4 calculates a state quantity SOC2 that represents an SOC of power storage device 6-2, based on current value Ib2 from current sensor 10-2, voltage value Vb2 from voltage sensor 12-2 and temperature Tb2 from temperature sensor 14-2, and provides state quantity SOC2 thus calculated to converter ECU 2 together with temperature Tb2. Various known methods may be employed for calculating state quantities SOC1 and SOC2.

Converter ECU 2 produces drive signals PWC1 and PWC2 for driving converters 8-1 and 8-2, based on various sensed values provided from current sensors 10-1 and 10-2, voltage sensors 12-1 and 12-2, and voltage sensor 18 as well as temperatures Tb1 and Tb2 and state quantities SOC1 and SOC2 provided from battery ECU 4, and torque target values TR1 and TR2 and revolution speed target values MRN1 and MRN2 provided from drive ECU 32. Converter ECU 2 provides drive signals PWC1 and PWC2 thus produced to converters 8-1 and 8-2 for controlling converters 8-1 and 8-2, respectively. A structure of converter ECU 2 will be described later in detail.

Figure 2:
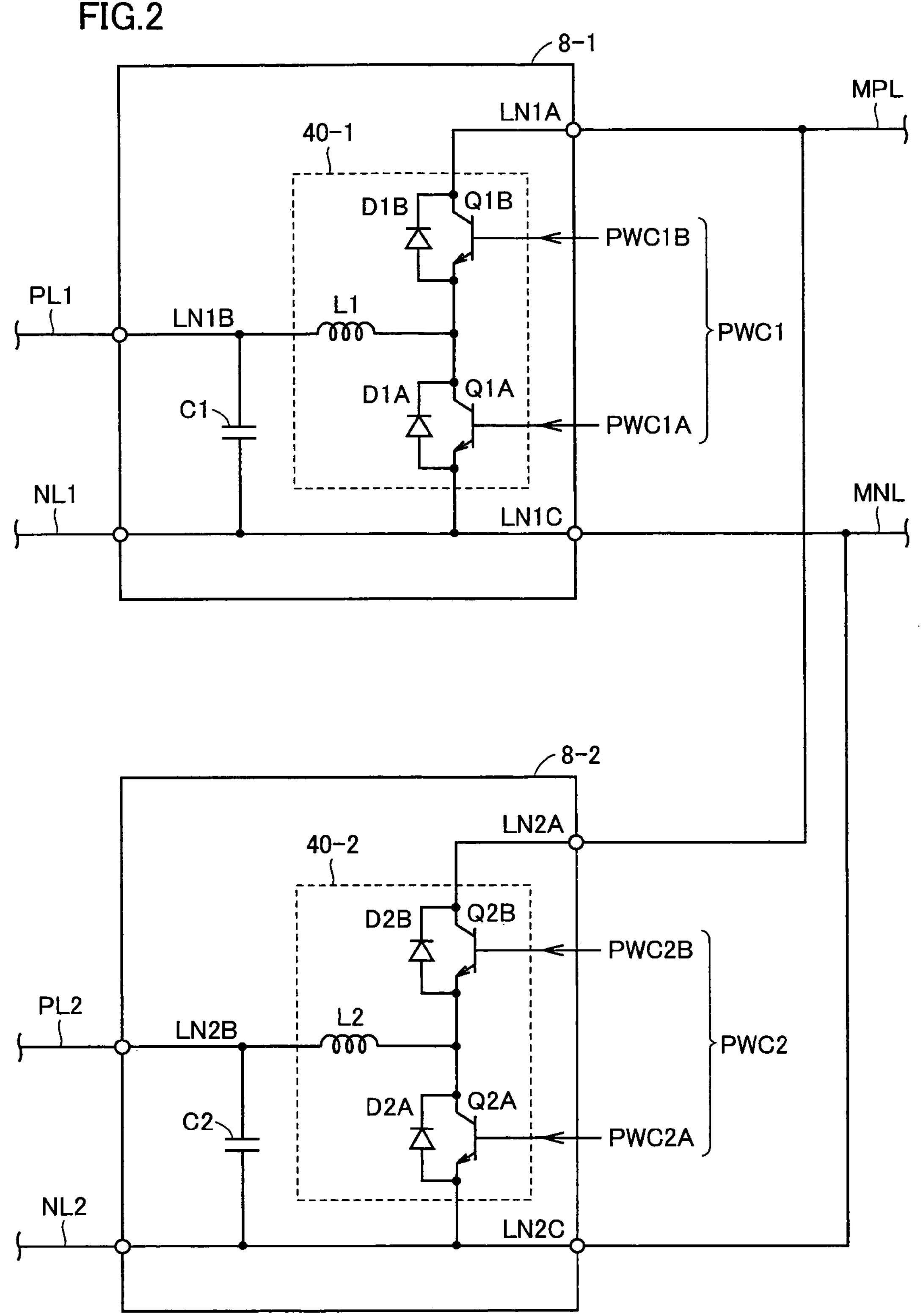
FIG. 2 shows schematic structures of converters shown in FIG. 1.

FIG. 2 shows schematic structures of converters 8-1 and 8-2 shown in FIG. 1. A structure and an operation of converter 8-2 are substantially the same as those of converter 8-1, and therefore the following description will be given on the structure and operation of converter 8-1. Referring to FIG. 2, converter 8-1 includes a chopper circuit 40-1, a positive bus line LN1A, a negative bus line LN1C, an interconnection LN1B and a smoothing capacitor C1. Chopper circuit 40-1 includes transistors Q1A and Q1B, diodes D1A and D1B, and an inductor L1.

One of ends of positive bus line LN1A is connected to a collector of transistor Q1B, and the other is connected to main positive bus line MPL. One of ends of negative bus line LN1C is connected to negative line NL1, and the other is connected to main negative bus line MNL.

Transistors Q1A and Q1B are connected in series between negative bus line LN1C and positive bus line LN1A. Specifically, an emitter of transistor Q1A is connected to negative bus line LN1C, and a collector of transistor Q1B is connected to positive bus line LN1A. Diodes D1A and D1B are connected in antiparallel to transistors Q1A and Q1B, respectively. Inductor L1 is connected to a node between transistors Q1A and Q1B.

One end of interconnection LN1B is connected to positive line PL1, and the other end is connected to inductor L1. Smoothing capacitor C1 is connected between interconnection LN1B and negative bus line LN1C, and reduces AC components included in the DC voltage between interconnection LN1B and negative bus line LN1C.

In response to drive signal PWC1 from converter ECU 2 (not shown), chopper circuit 40-1 boosts the DC power (drive power) received from positive and negative lines PL1 and NL1 during the discharge operation of power storage device 6-1, and steps down the DC power (regenerative power) received from main positive bus line MPL and main negative bus line MNL during the charge operation of power storage device 6-1.

Voltage converting operations (boosting and stepping down operations) of converter 8-1 will now be described. In the boosting operation, converter ECU 2 keeps transistor Q1B off, and turns on/off transistor Q1A with a predetermined duty ratio. During the on period of transistor Q1A, a discharge current flows from power storage device 6-1 to main positive bus line MPL via interconnection LN1B, inductor L1, diode D1B and positive bus line LN1A. Simultaneously, a pump current flows from power storage device 6-1 via interconnection LN1B, inductor L1, transistor Q1A and negative bus line LN1C. Inductor L1 accumulates an electromagnetic energy by this pump current. When transistor Q1A changes from the on state to the off state, inductor L1 superimposes the accumulated electromagnetic energy on the discharge current. Consequently, an average voltage of the DC power supplied from converter 8-1 to main positive bus line MPL and main negative bus line MNL is boosted by a magnitude corresponding to the electromagnetic energy accumulated in inductor L1 according to the duty ratio.

In the stepping down operation, converter ECU 2 turns on/off transistor Q1B with a predetermined duty ratio, and keeps transistor Q1A off. During the off period of transistor Q1B, the charge current flows from main positive bus line MPL to power storage device 6-1 via positive bus line LN1A, transistor Q1B, inductor L1 and interconnection LN1B. When transistor Q1B changes from the on state to the off state, inductor L1 generates a magnetic flux that may prevent changes in current so that the charge current continues the flowing via diode D1A, inductor L1 and interconnection LN1B. From the viewpoint of the electric energy, main positive bus line MPL and main negative bus line MNL supply the DC power only during the on period of transistor Q1B, and therefore the average voltage of the DC power supplied from converter 8-1 to power storage device 6-1 takes a value obtained by multiplying the DC voltage between main positive bus line MPL and main negative bus line MNL by the duty ratio, assuming that the charge current is kept constant (i.e., inductor L1 has a sufficiently large inductance).

For controlling the voltage converting operation of converter 8-1, converter ECU 2 produces drive signal PWC1 formed of a drive signal PWC1A for controlling on/off of transistor Q1A and a drive signal PWC1B for controlling on/off of transistor Q1B.

Figure 3:
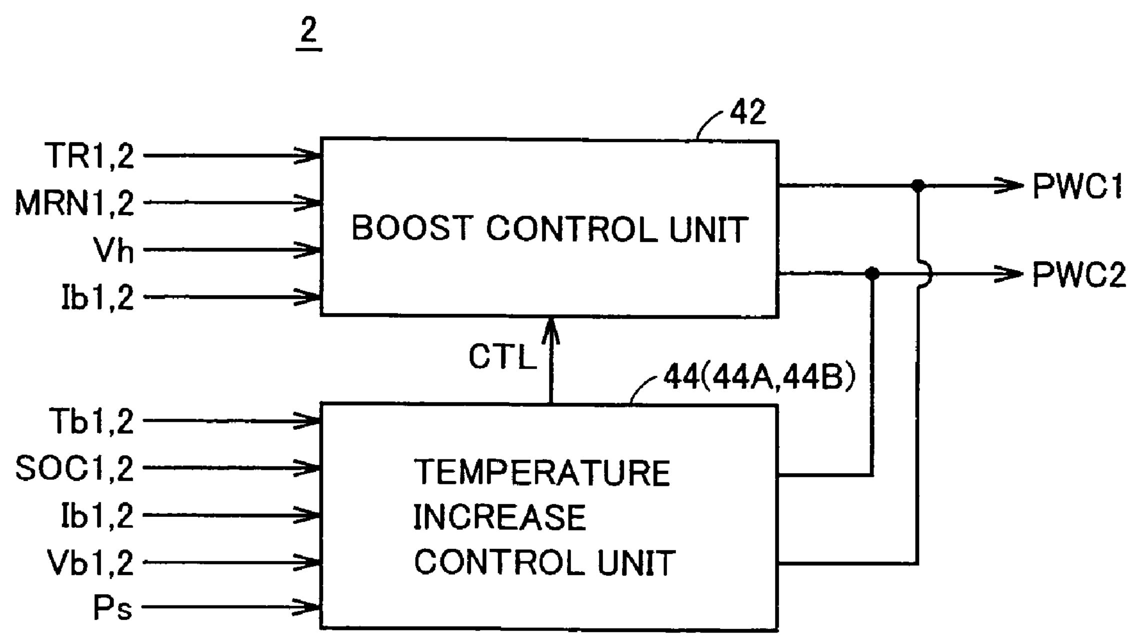
FIG. 3 is a functional block diagram of a converter ECU shown in FIG. 1.

FIG. 3 is a functional block diagram of converter ECU 2 shown in FIG. 1. Referring to FIG. 3, converter ECU 2 includes a boost control unit 42 and a temperature increase control unit 44. Boost control unit 42 receives torque target values TR1 and TR2 as well as revolution speed target values MRN1 and MRN2 of motor generators 34-1 and 34-2 from drive ECU 32. Boost control unit 42 receives voltage value Vh from voltage sensor 18, and also receives current values Ib1 and Ib2 from current sensors 10-1 and 10-2, respectively.

When a control signal CTL from temperature increase control unit 44 is inactive, i.e., when temperature increase control unit 44 is not executing the temperature increase control, boost control unit 42 produces, based on the above signals, drive signals PWC1 and PWC2 for driving converters 8-1 and 8-2, and provides drive signals PWC1 and PWC2 thus produced to converters 8-1 and 8-2, respectively. When control signal CTL is active, i.e., when temperature increase control unit 44 is executing the temperature increase control, boost control unit 42 stops the production of drive signals PWC1 and PWC2.

Temperature increase control unit 44 receives temperatures Tb1 and Tb2 as well as state quantities SOC1 and SOC2 from battery ECU 4. Temperature increase control unit 44 also receives current values Ib1 and Ib2 from current sensors 10-1 and 10-2, respectively, and receives voltage values Vb1 and Vb2 from voltage sensors 12-1 and 12-2, respectively. Further, temperature increase control unit 44 receives vehicle-required power Ps from drive ECU 32. Temperature increase control unit 44 executes the temperature increase control for increasing temperatures of power storage devices 6-1 and 6-2 by transferring the electric powers between power storage devices 6-1 and 6-2 via converters 8-1 and 8-2 as well as main positive bus line MPL and main negative bus line MNL when one of temperatures Tb1 and Tb2 indicating the temperatures of power storage devices 6-1 and 6-2 is lower than a specified value.

More specifically, when one of temperatures Tb1 and Tb2 is lower than the specified value, temperature increase control unit 44 produces drive signals PWC1 and PWC2 by the method to be described later based on the above respective signals. Temperature increase control unit 44 provides drive signals PWC1 and PWC2 thus produced to converters 8-1 and 8-2, respectively, and activates control signal CTL provided to boost control unit 42.

Figure 4:
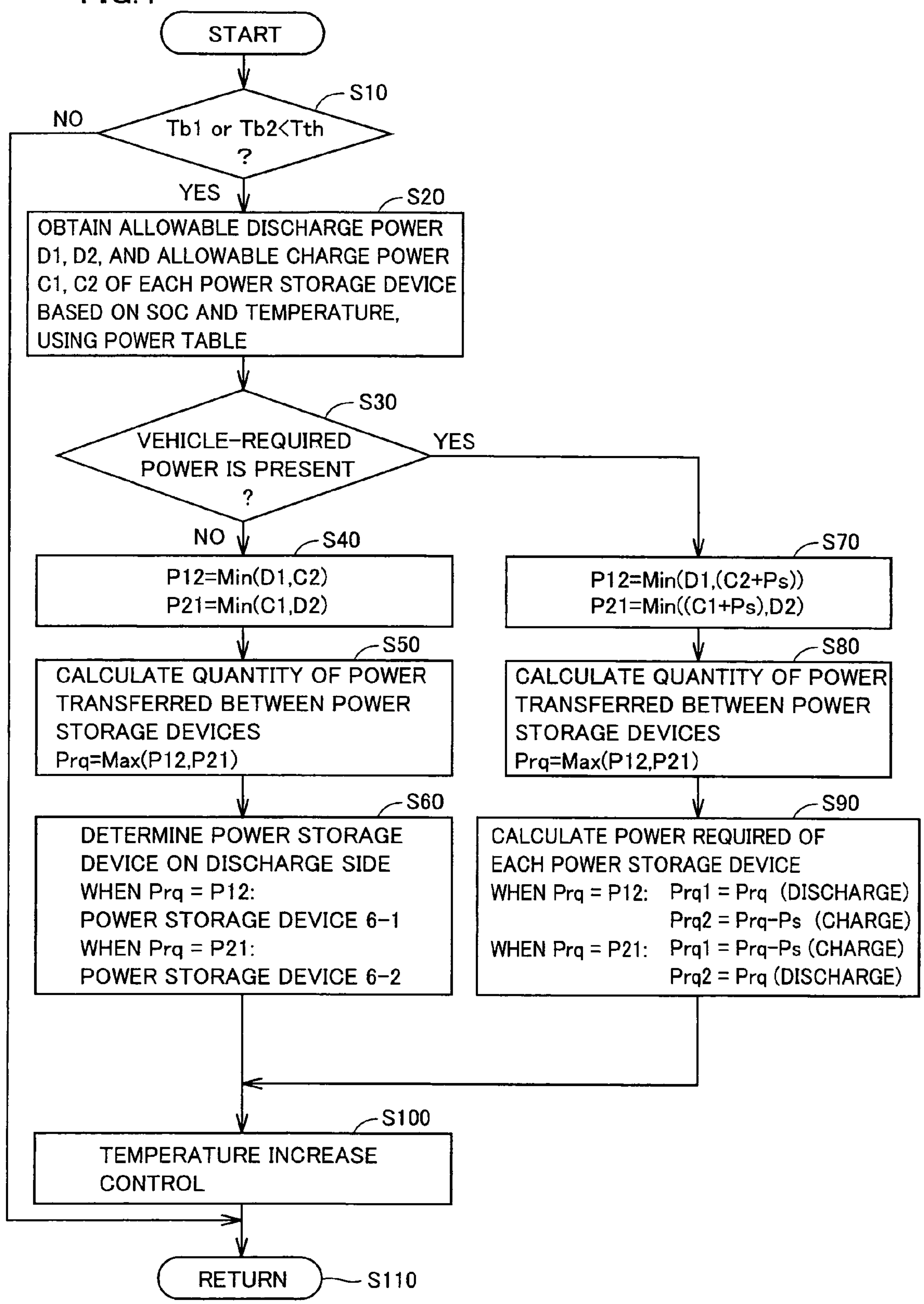
FIG. 4 is a flowchart illustrating a control structure of a temperature increase control unit shown in FIG. 3.

FIG. 4 is a flowchart illustrating a control structure of temperature increase control unit 44 shown in FIG. 3. The processing shown in this flowchart is called for execution from a main routine at predetermined intervals or when a predetermined condition is satisfied.

Referring to FIG. 4, temperature increase control unit 44 determines whether temperature Tb1 of power storage device 6-1 or temperature Tb2 of power storage device 6-2 is lower than a preset threshold temperature Tth (e.g., −10° C.) or not (step S10). When temperature increase control unit 44 determines that neither temperature Tb1 nor Tb2 is equal to or higher than threshold temperature Tth (NO in step S10), it advances the processing to a step S110.

When it is determined in step S10 that temperature Tb1 or Tb2 is lower than threshold temperature Tth (YES in step S10), temperature increase control unit 44 obtains an allowable discharge power D1 and an allowable charge power C1 (both positive value) of power storage device 6-1 based on state quantity SOC1 and temperature Tb1 of power storage device 6-1, and also obtains an allowable discharge power D2 and an allowable charge power C2 (both positive value) of power storage device 6-2 based on state quantity SOC2 and temperature Tb2 of power storage device 6-2, using a preset electric power table (step S20).

Figure 5:
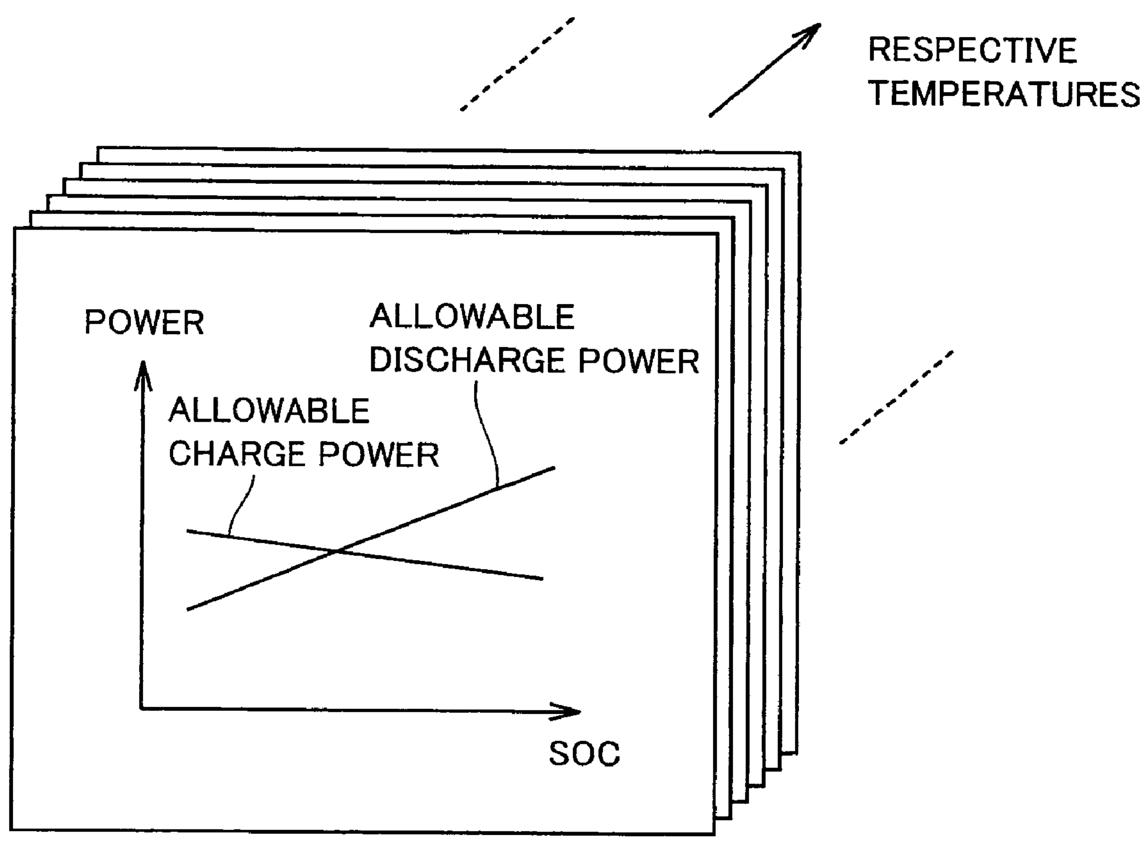
FIG. 5 illustrates an electric power table relating to an allowable discharge power and an allowable charge power of each power storage device.

FIG. 5 illustrates the electric power table relating to the allowable discharge power and allowable charge power of each power storage device. Referring to FIG. 5, the electric power table is employed for each of power storage devices 6-1 and 6-2, and it sets the allowable discharge power and allowable charge power corresponding to the respective SOCs and the respective temperatures of the power storage device. Each table value is obtained offline in advance for each of corresponding conditions (SOC and temperature).

Referring to FIG. 4 again, when the allowable discharge power and allowable charge power are obtained in step S20, temperature increase control unit 44 determines, based on vehicle-required power Ps from drive ECU 32, whether the power supply from power supply system 1 to drive power generating unit 3 is required or not (step S30). When temperature increase control unit 44 determines that the power supply from power supply system 1 to drive power generating unit 3 is not required (NO in step S30), a maximum power P12 that can be supplied from power storage device 6-1 to power storage device 6-2 as well as a maximum power P21 that can be supplied from power storage device 6-2 to power storage device 6-1 are calculated based on the following equation (step S40).

$$P12=\mathrm{Min}(D1,C2) \quad (1)$$

$$P21=\mathrm{Min}(C1,D2) \quad (2)$$

where Min(X, Y) represents selection of smaller one of X and Y.

Then, temperature increase control unit 44 calculates a quantity Prq of the power transferred between power storage devices 6-1 and 6-2 based on the following equation so that the charge/discharge powers of power storage devices 6-1 and 6-2 may become maximum (step S50).

$$Prq=\mathrm{Max}(P12,P21) \tag{3}$$

where Max(X, Y) represents selection of larger one of X and Y.

Further, temperature increase control unit 44 determines the direction of power transfer between power storage devices 6-1 and 6-2 by handling power storage device 6-1 as the discharge side (i.e., handling power storage device 6-2 as the charge side) when Prq is equal to P12 (i.e., P12>P21), and handling power storage device 6-2 as the discharge side (i.e., handling power storage device 6-1 as the charge side) when Prq is equal to P21 (i.e., P12<P21) (step S60).

When temperature increase control unit 44 determines quantity Prq of the power transferred between power storage devices 6-1 and 6-2 as well as the power transfer direction, temperature increase control unit 44 controls converters 8-1 and 8-2 to pass transferred power quantity Prq between power storage devices 6-1 and 6-2 according to the power transfer direction thus determined, and thus practically executes the temperature increase control (step S100).

When it is determined in step S30 that the power supply from power supply system 1 to drive power generating unit 3 is required (YES in step S30), the temperature increase control of the power storage device is executed while supplying the electric power from power supply system 1 to drive power generating unit 3. More specifically, temperature increase control unit 44 calculates maximum power P12 that can be supplied to power storage device 6-2 while supplying the power from power storage device 6-1 to drive power generating unit 3 as well as maximum power P21 that can be supplied to power storage device 6-1 while supplying the power from power storage device 6-2 to drive power generating unit 3, based on the following equations (step S70).

$$P12=\mathrm{Min}(D1,(C2+Ps)) \tag{4}$$

$$P21=\mathrm{Min}((C1+Ps),D2) \tag{5}$$

Then, temperature increase control unit 44 calculates quantity Prq of the power transferred between power storage devices 6-1 and 6-2 so that the power transferred between power storage devices 6-1 and 6-2 may become maximum, based on the following equation (step S80):

$$Prq=\mathrm{Max}(P12,P21) \tag{6}$$

Further, temperature increase control unit 44 calculates powers Prq1 and Prq2 required of power storage devices 6-1 and 6-2, respectively, based on the following equations (step S90).

When Prq=P12:

$$Prq1=Prq\ \text{(discharge)},\ Prq2=Prq-Ps\ \text{(charge)} \tag{7}$$

When Prq=P21:

$$Prq1=Prq-Ps\ \text{(charge)},\ Prq2=Prq\ \text{(discharge)} \tag{8}$$

When the respective powers required of power storage devices 6-1 and 6-2 are determined, temperature increase control unit 44 advances the processing to step S100, and practically executes the temperature increase control by controlling converters 8-1 and 8-2 such that power storage devices 6-1 and 6-2 perform the charging or discharging according to the required powers thus determined.

Figure 6:
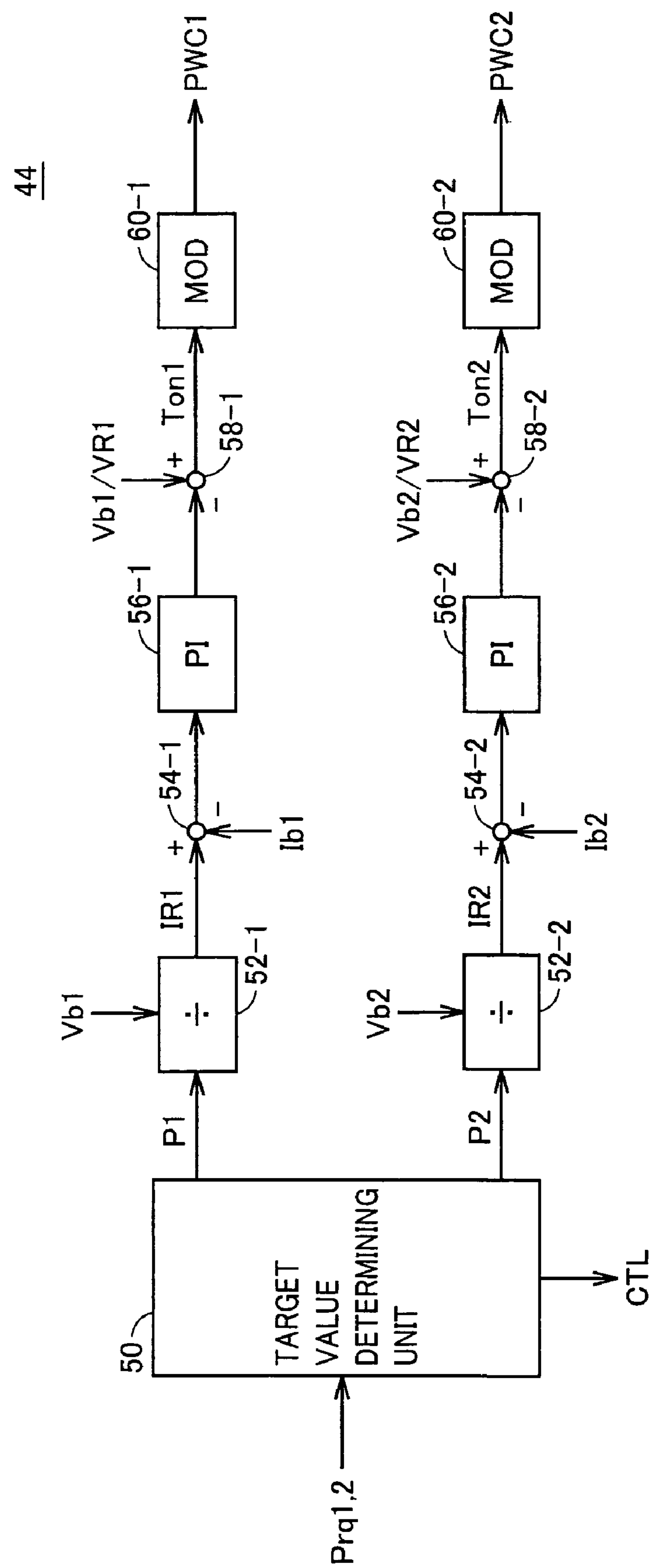
FIG. 6 is a functional block diagram showing a temperature increase control unit of a portion relating to drive control of the converters.

FIG. 6 is a functional block diagram showing temperature increase control unit 44 of the portion relating to drive control of converters 8-1 and 8-2. The processing shown in FIG. 6 corresponds to the processing executed in step S100 shown in FIG. 5. Referring to FIG. 6, temperature increase control unit 44 includes a target value determining unit 50, division units 52-1 and 52-2, subtraction units 54-1, 54-2, 58-1 and 58-2, PI control units 56-1 and 56-2, and modulation units 60-1 and 60-2.

Target value determining unit 50 activates control signal CTL provided to boost control unit 42 (FIG. 3) when the temperature increase control is executed. When power storage device 6-1 is on the discharge side, target value determining unit 50 provides power Prq1 required of power storage device 6-1 (when the vehicle-required power is not present, Prq1 is equal to Prq, and the same is true in the following description), as power target value P1, to division unit 52-1, and also provides a value obtained by inverting a sign of power Prq2 required of power storage device 6-2 (when the vehicle-required power is not present, Prq2 is equal to Prq, and the same is true in the following description), as power target value P2 (i.e., a negative value), to division unit 52-2.

When power storage device 6-2 is on the discharge side, target value determining unit 50 provides the value obtained by inverting the sign of power Prq1 required of power storage device 6-1, as power target value P1 (i.e., a negative value), to division unit 52-1, and provides power Prq2 required of power storage device 6-2, as power target value P2, to division unit 52-2.

Division unit 52-1 divides power target value P1 by voltage value Vb1, and provides a result of this operation, as a current target value IR1, to subtraction unit 54-1. Subtraction unit 54-1 subtracts current value Ib1 from current target value IR1, and provides a result of this operation to PI control unit 56-1. PI control unit 56-1 performs a proportional integral operation, using a difference between current target value IR1 and current value Ib1 as an input, and provides a result of this operation to subtraction unit 58-1.

Subtraction unit 58-1 subtracts the output of PI control unit 56-1 from an inverse number of a theoretical boost ratio of converter 8-1 represented as (voltage value Vb1)/(target voltage VR1), and provides a result of this operation to modulation unit 60-1 as a duty instruction Ton1. The input term (voltage value Vb1)/(target voltage VR1) in this subtraction unit 58-1 is a feedforward compensation term based on a theoretical boost ratio of converter 8-1. The target voltage VR1 is set to an appropriate value higher than voltage value Vb1.

Modulation unit 60-1 produces drive signal PWC1 based on duty instruction Ton1 and a carrier wave produced by an oscillation unit (not shown), and provides drive signal PWC1 thus produced to transistors Q1A and Q1B of converter 8-1.

Division unit 52-2 divides power target value P2 by voltage value Vb2, and provides a result of the operation to subtraction unit 54-2 as a current target value IR2. Subtraction unit 54-2 subtracts current value Ib2 from current target value IR2, and provides a result of this operation to PI control unit 56-2. PI control unit 56-2 performs a proportional integral operation, using a difference between current target value IR2 and current value Ib2 as an input, and provides a result of this operation to subtraction unit 58-2.

Subtraction unit 58-2 subtracts the output of PI control unit 56-2 from an inverse number of a theoretical boost ratio of converter 8-2 represented as (voltage value Vb2)/(target voltage VR2), and provides a result of this operation to modulation unit 60-2 as a duty instruction Ton2. The input term (voltage value Vb2)/(target voltage VR2) in this subtraction unit 58-2 is a feedforward compensation term based on a theoretical boost ratio of converter 8-2. The target voltage VR2 is set to an appropriate value higher than voltage value Vb2.

Modulation unit 60-2 produces drive signal PWC2 based on duty instruction Ton2 and a carrier wave produced by an oscillation unit (not shown), and provides drive signal PWC2 thus produced to transistors Q2A and Q2B of converter 8-2.

When the vehicle-required power is not present, i.e., when all the power output from one of power storage devices 6-1 and 6-2 is supplied to the other power storage device, the control system of the converter corresponding to the power storage device on the charging side may operate to turn off the function of the PI control unit and to set the feedforward compensation term to 1. Thereby, in the converter corresponding to the power storage device on the charging side, the upper arm is always on so that the switching loss can be small, and the interference between the control systems of converters 8-1 and 8-2 can be prevented.

According to the first embodiment, as described above, the power is transferred between power storage devices 6-1 and 6-2 via main positive bus line MPL and main negative bus line MNL, and the temperature of each power storage device is increased according to the charge/discharge. Accordingly, the first embodiment can actively increase the temperatures of power storage devices 6-1 and 6-2. Consequently, a desired drive performance can be ensured early after the start of the vehicle system even when the temperature was low.

Also, according to the first embodiment, the temperature increase control is executed to maximize the quantity of power transferred between power storage devices 6-1 and 6-2 so that the temperatures of power storage devices 6-1 and 6-2 can be rapidly increased.

Further, according to the first embodiment, the allowable discharge power and allowable charge power of each power storage device are determined based on the SOC and temperature of the power storage device so that the charge/discharge power between power storage devices 6-1 and 6-2 can be accurately calculated.

Further, when the vehicle-required power is present, the power is transferred between power storage devices 6-1 and 6-2 while supplying the power from power supply system 1 to drive power generating unit 3 so that the system can cope with the case where the vehicle starts the running during the temperature increase control.

Second Embodiment

In the first embodiment, the direction of power transfer between the power storage devices is determined to maximize the power transferred between power storage devices. In the second embodiment, however, the power transfer direction is determined to maximize the heating value of the power storage device.

A whole structure of a vehicle according to the second embodiment is the same as that of vehicle 100 of the first embodiment shown in FIG. 1. Also, a whole structure of a converter ECU in the second embodiment is the same as that of converter ECU 2 of the first embodiment shown in FIG. 3.

Figure 7:
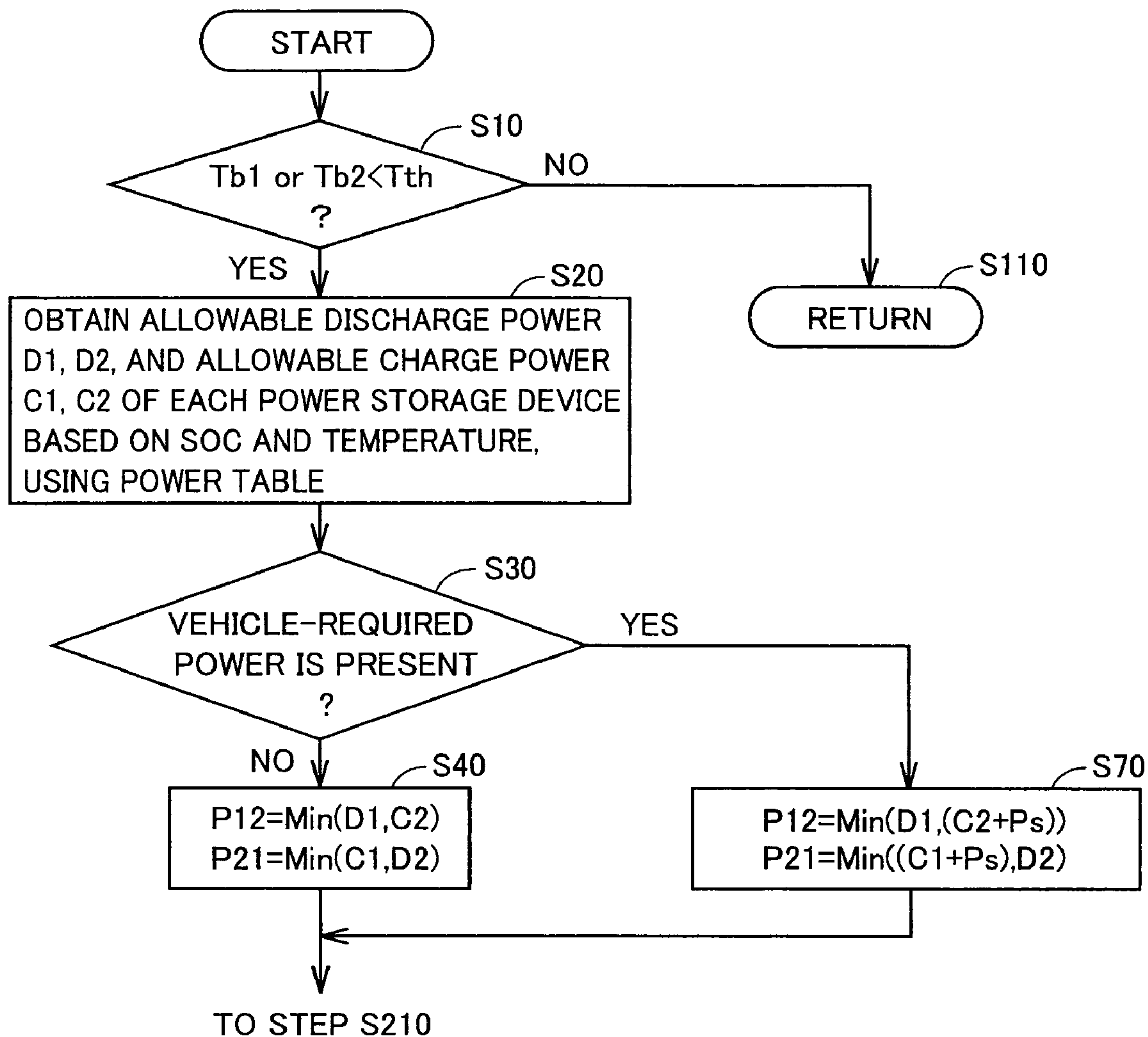
FIG. 7 is a first flowchart illustrating a control structure of a temperature increase control unit in a second embodiment.
Figure 8:
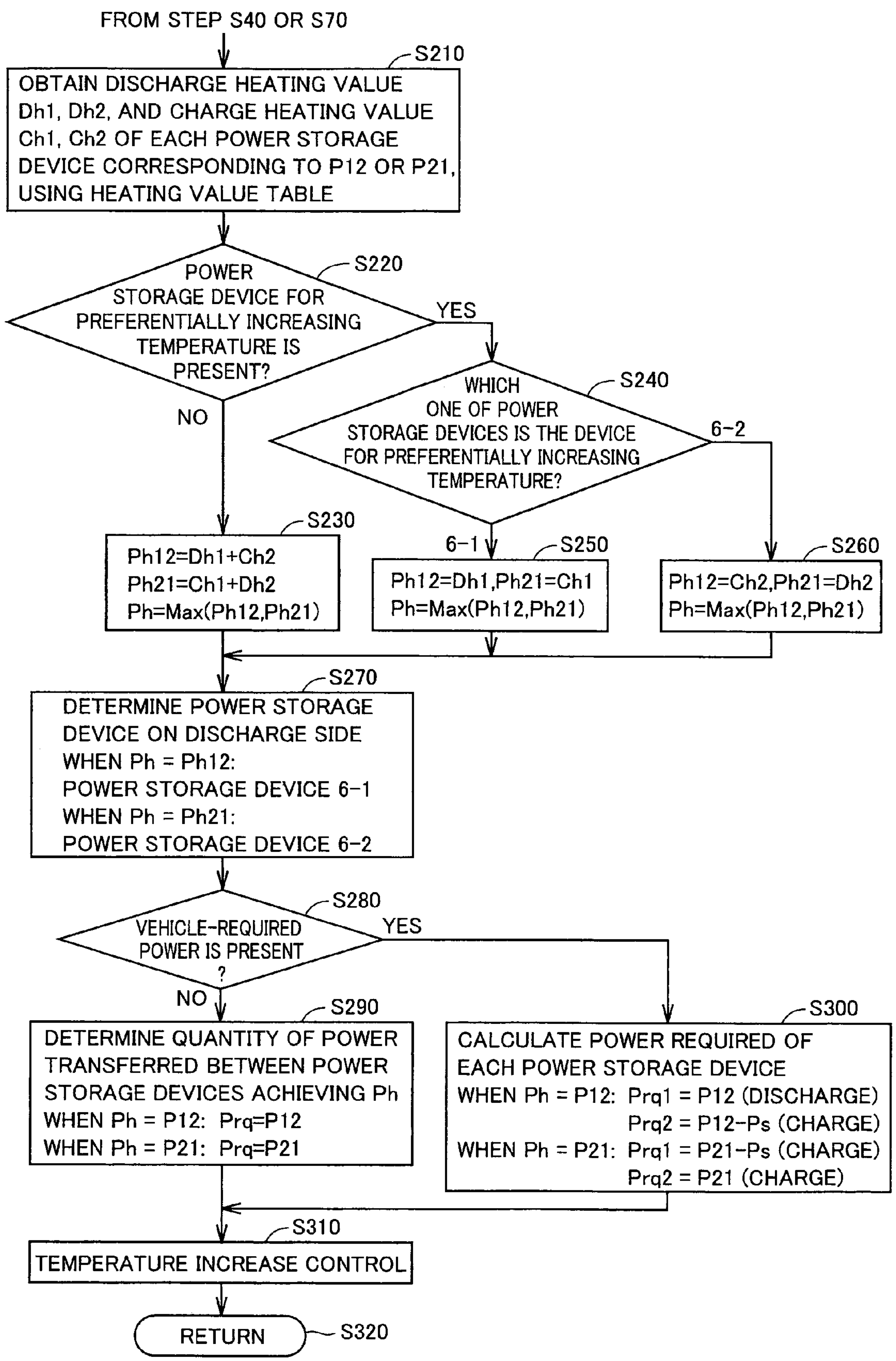
FIG. 8 is a second flowchart illustrating the control structure of the temperature increase control unit in the second embodiment.

FIGS. 7 and 8 are flowcharts for illustrating a control structure of a temperature increase control unit 44A in the second embodiment. The processing shown in this flowchart is likewise called for execution from a main routine at predetermined intervals or when a predetermined condition is satisfied.

Referring to FIG. 7, temperature increase control unit 44A executes the processing in steps S10, S20, S30, S40 and S70. The processing in these steps is already described with reference to FIG. 4. When temperature increase control unit 44A completes the processing in step S40 or S70, it advances the processing to step S210.

Referring to FIG. 8, temperature increase control unit 44A obtains a discharge heating value Dh1 (i.e., a heating value during discharging) of power storage device 6-1 and a charge heating value Ch2 (i.e., a heating value during charging) of power storage device 6-2 that correspond to maximum power P12 calculated in step S40 or S70 shown in FIG. 7, based on the SOCs and temperatures of the corresponding power storage devices, using a preset heating value table (step S210). Also, temperature increase control unit 44A obtains a charge heating value Ch1 and a discharge heating value Dh2 based on the SOCs and temperatures of the corresponding power storage devices that correspond to maximum power P21 calculated in step S40 or S70, based on the SOCs and temperatures of the corresponding power storage devices, using the preset heating value table (step S210).

Figure 9:
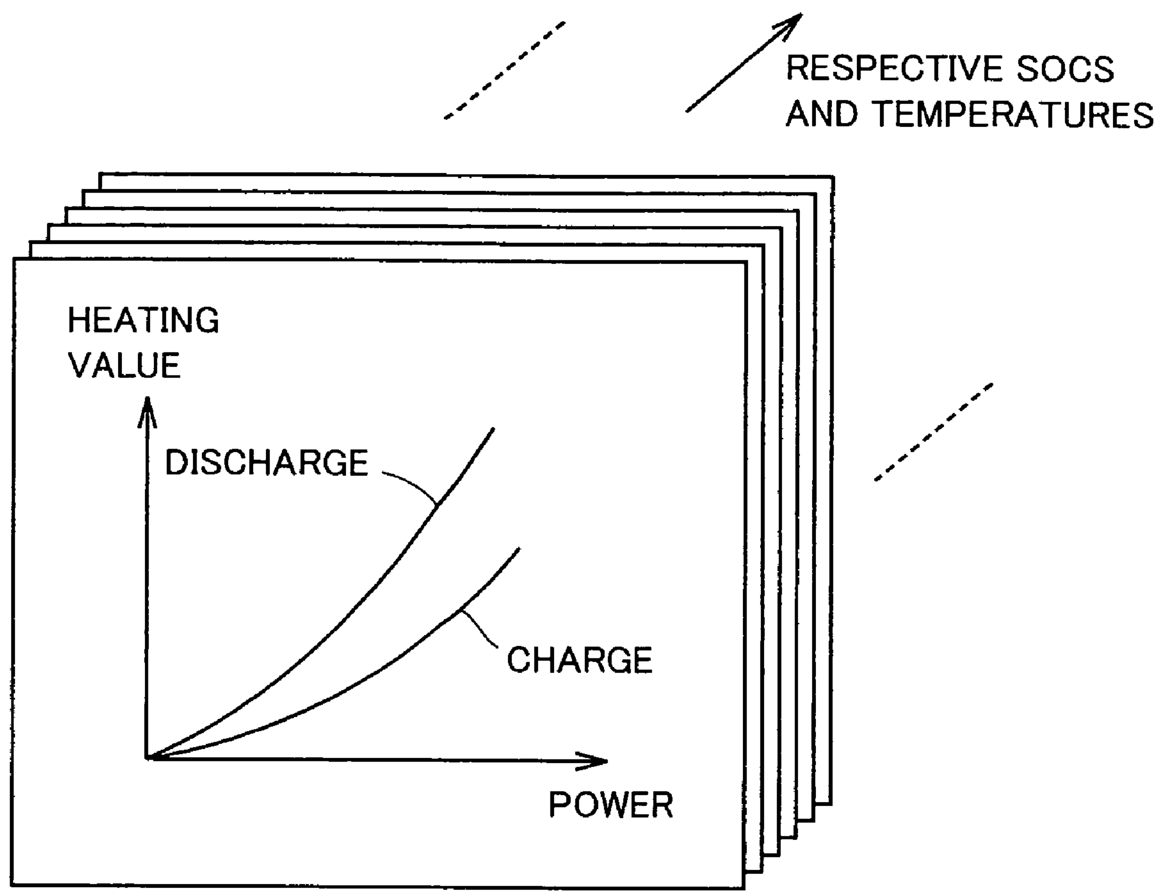
FIG. 9 illustrates a heating value table relating to a heating value during discharging and that during charging of each power storage device.

FIG. 9 illustrates the heating value table relating to the discharge heating value and charge heating value of each power storage device. Referring to FIG. 9, the heating value table is employed for each of power storage devices 6-1 and 6-2, and it sets the heating value related to the discharge electric power (i.e., the discharge heating value) as well as the heating value related to the charge electric power (i.e., the charge heating value) are set corresponding to the respective SOCs and the respective temperatures of the power storage device. Each table value is obtained offline for each of the corresponding conditions (discharge power, charge power, SOC and temperature).

Referring to FIG. 8 again, when the discharge and charge heating values of each power storage device is obtained in step S210, temperature increase control unit 44A determines whether the power storage device of which temperature is to be preferentially increased is set or not (step S220). When temperature increase control unit 44A determines that the power storage device of which temperature is to be preferentially increased is not set (NO in step S220), it performs the calculations from the following equations to obtain a total heating value Ph12 of power storage devices 6-1 and 6-2 assuming that maximum power P12 is supplied from power storage device 6-1 to power storage device 6-2, and to obtain a total heating value Ph21 of power storage devices 6-1 and 6-2 assuming that maximum power P12 is supplied from power storage device 6-2 to power storage device 6-1. Also, temperature increase control unit 44A calculates a heating value Ph, based on the following equations, such that the total heating value of power storage devices 6-1 and 6-2 attains the maximum (step S230).

$$Ph12=Dh1+Ch2 \quad (9)$$

$$Ph21=Ch1+Dh2 \quad (10)$$

$$Ph=\mathrm{Max}(Ph12,Ph21) \quad (11)$$

When it is determined in step S220 that the power storage device of which temperature is to be preferentially increased is set (YES in step S220), temperature increase control unit 44A determines which of power storage devices 6-1 and 6-2 is set (step S240). When temperature increase control unit 44A determines that the power storage device 6-1 is set as the power storage device of which temperature is to be preferentially increased ("6-1" in step S240), heating value Ph is calculated so that the heating value of power storage device 6-1 may become maximum, based on the following equations (step S250).

$$Ph12=Dh1 \quad (12)$$

$$Ph21=Ch1 \quad (13)$$

$$Ph=\mathrm{Max}(Ph12,Ph21) \quad (14)$$

When it is determined in step S240 that power storage device 6-2 is set as the power storage device of which temperature is to be preferentially increased ("6-2" in step S240), temperature increase control unit 44A calculates heating value Ph so that the heating value of power storage device 6-2 may become maximum, based on the following equations (step S260).

$$Ph12=Ch2 \quad (15)$$

$$Ph21=Dh2 \quad (16)$$

$$Ph=\mathrm{Max}(Ph12,Ph21) \quad (17)$$

When Ph is equal to Ph12 (i.e., Ph12>Ph21), temperature increase control unit 44A sets power storage device 6-1 on the discharge side (i.e., handles power storage device 6-2 on the charge side). When Ph is equal to Ph21 (i.e., Ph12<Ph21), temperature increase control unit 44A sets power storage device 6-2 on the discharge side (i.e., sets power storage device 6-1 on the charge side). In this manner, temperature increase control unit 44A determines the transfer direction of the power between power storage devices 6-1 and 6-2 (step S270).

Then, temperature increase control unit 44A determines, based on vehicle-required power Ps from drive ECU 32, whether the power supply from power supply system 1 to drive power generating unit 3 is required or not (step S280). When temperature increase control unit 44A determines that the power supply from power supply system 1 to drive power generating unit 3 is not required (NO in step S280), it determines quantity Prq of the power transferred between power storage devices 6-1 and 6-2, based on the following equations (step S290).

$$\text{When } Ph=Ph12\text{: } Prq=P12 \quad (18)$$

$$\text{When } Ph=Ph21\text{: } Prq=P21 \quad (19)$$

When the transfer direction and quantity Prq of the power transferred between power storage devices 6-1 and 6-2 are determined, temperature increase control unit 44A actually executes the temperature increase control by controlling converters 8-1 and 8-2 to pass transferred power quantity Prq between power storage devices 6-1 and 6-2 in the determined transfer direction (step S310).

When it is determined in step S280 that the power supply from power supply system 1 to drive power generating unit 3 is required (YES in step S280), temperature increase control unit 44A calculates powers Prq1 and Prq2 required of power storage devices 6-1 and 6-2, respectively, based on the following equations (step S300):

When Ph=Ph12:

$$Prq1=P12 \text{ (discharge)}, Prq2=P12-Ps \text{ (charge)} \quad (20)$$

When Ph=P21

$$Prq1=P21-Ps \text{ (charge)}, Prq2=P21 \text{ (discharge)} \quad (21)$$

When the powers required of respective power storage devices 6-1 and 6-2 are determined, temperature increase control unit 44A advances the processing to step S310, in which it actually executes the temperature increase control by controlling converters 8-1 and 8-2 to perform the charging or discharging of power storage devices 6-1 and 6-2 according to the required powers thus determined.

According to the second embodiment, as described above, the transfer direction and the quantity of the power transferred between power storage devices 6-1 and 6-2 are determined based on the discharge heating value and the charge heating value of each power storage device. Therefore, the heat generation of each power storage device caused by the charge/discharge can be managed while transferring the power between power storage devices 6-1 and 6-2. Accordingly, the first embodiment can actively increase the temperatures of power storage devices 6-1 and 6-2, and can manage the state of temperature increase of each power storage device.

Also, when the power storage device of which temperature is to be preferentially increased is not set, the first embodiment executes the temperature increase control to maximize the sum of the heating values of power storage devices 6-1 and 6-2, and therefore can rapidly increase the temperatures of power storage devices 6-1 and 6-2. In general, when the power storage device of which temperature is to be preferentially increased is set, the temperature increase control is executed to maximize the heating value of the power storage device thus set so that the temperature of the power storage device thus set can be rapidly increased.

Third Embodiment

In the first embodiment, the allowable discharge power and allowable charge power are obtained, using the power table, and the power transfer direction is determined based on them to maximize the transferred power quantity between power storage devices 6-1 and 6-2. However, the allowable discharge power and allowable charge power of each power storage device depends on the SOC of the power storage device. According to the first embodiment, therefore, the transferred power quantity takes a currently maximum value in the present operation point, but there may be an operation point where the transferred power quantity can be further increased. According to a third embodiment, therefore, an operation point (i.e., target SOC) where the power mutually transferred between power storage devices 6-1 and 6-2 attains the maximum is obtained, and the charge/discharge of power storage devices 6-1 and 6-2 is controlled to approach the operation point thus obtained.

Figure 10:
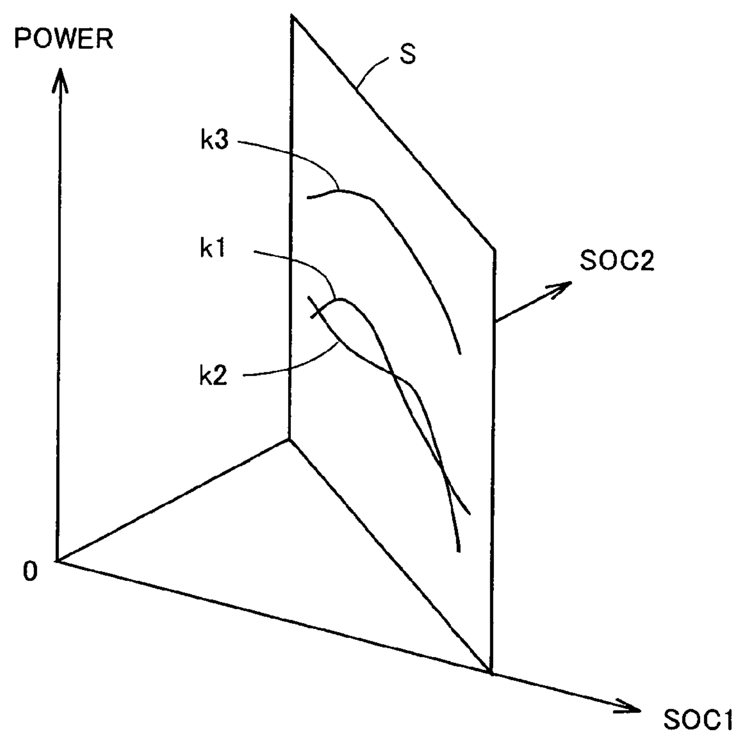
FIG. 10 shows a relationship between an SOC of each power storage device and a maximum electric power that can be transferred between the power storage devices.

FIG. 10 shows a relationship between the SOC of each power storage device and the maximum power that can be transferred between the power storage devices. Referring to FIG. 10, a curve k1 represents a locus of the maximum power that can be supplied from power storage device 6-1 to power storage device 6-2, within a range of the achievable SOC determined based on the total power storage quantity of power storage devices 6-1 and 6-2. A curve k2 represents a locus of the maximum power that can be supplied from power storage device 6-2 to power storage device 6-1, within a range of the achievable SOC determined based on the total power storage quantity of power storage devices 6-1 and 6-2. A curve k3 represents a sum of curves k1 and k2.

Curves k1-k3 are present within a plane S defining a range of the achievable SOC that is determined based on the total power storage quantity of power storage devices 6-1 and 6-2. Curves k1 and k2 are calculated using the power table shown in FIG. 5. More specifically, the allowable discharge power and allowable charge power of each power storage device are obtained in for each achievable SOC that is determined based on the total power storage quantity of power storage devices 6-1 and 6-2, and smaller one of the allowable discharge power of power storage device 6-1 and the allowable charge power of power storage device 6-2 is plotted to obtain curve k1. Also, smaller one of the allowable charge power of power storage device 6-1 and the allowable discharge power of power storage device 6-2 is plotted to obtain curve k2.

Figure 11:
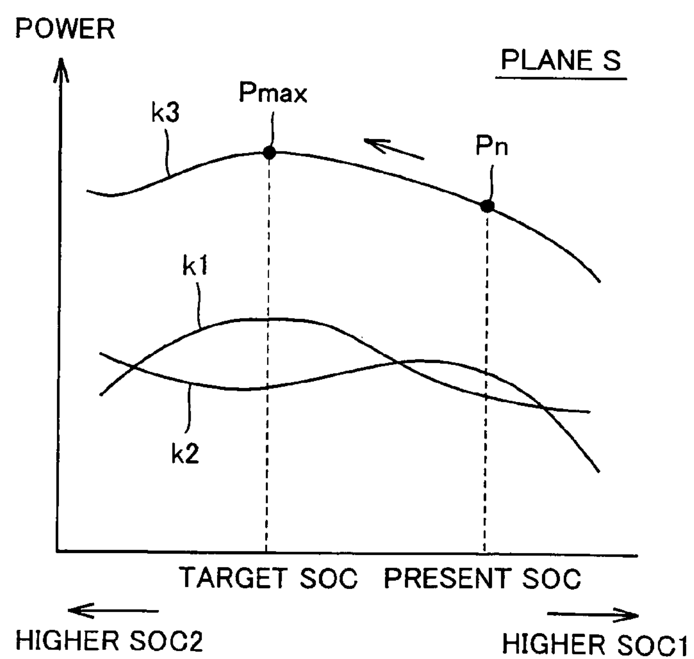
FIG. 11 illustrates an idea or concept of temperature increase control in a third embodiment.

FIG. 11 illustrates an idea or concept of the temperature increase control in the third embodiment. FIG. 11 shows plane S extracted from FIG. 10. Referring to FIG. 11, a point Pn on curve k3 indicates an operation point with a present SOC. Thus, the electric power quantity indicated by point Pn indicates a sum of the maximum power that can be supplied from power storage device 6-1 to power storage device 6-2 and the maximum power that can be supplied from power storage device 6-2 to power storage device 6-1.

A point Pmax on curve k3 is a maximum point on curve k3, and indicates an operation point where the sum of the maximum power suppliable from power storage device 6-1 to power storage device 6-2 and the maximum power suppliable from power storage device 6-2 to power storage device 6-1 attains the maximum. Thus, by transferring the electric power between power storage devices 6-1 and 6-2 near point Pmax, it is possible to maximize the quantity of the power transferred between power storage devices 6-1 and 6-2, i.e., the charge/discharge power of power storage devices 6-1 and 6-2.

In the third embodiment, therefore, the SOC corresponding to point Pmax is set as the target SOC, and the charge/discharge of each power storage device is controlled so that the SOC of each power storage device may approach the target SOC. In the example shown in FIG. 11, curve k2 is larger than curve k1 at the present operation point (point Pn) so that the instantaneous quantity of the power supplied from power storage device 6-2 to power storage device 6-1 is larger than that of the power supplied from the power storage device 6-1 to power storage device 6-2. However, by changing the operation point to Pmax, the quantity of the power transferred between power storage devices 6-1 and 6-2 can be maximized. Therefore, the third embodiment is configured to supply the power from power storage device 6-1 to power storage device 6-2 so that the operation point may approach Pmax (i.e., may approach the target SOC).

The whole structure of the vehicle according to the third embodiment is the same as that of vehicle 100 of the first embodiment shown in FIG. 1. The whole structure of the converter ECU in the third embodiment is the same as converter ECU 2 of the first embodiment shown in FIG. 3.

Figure 12:
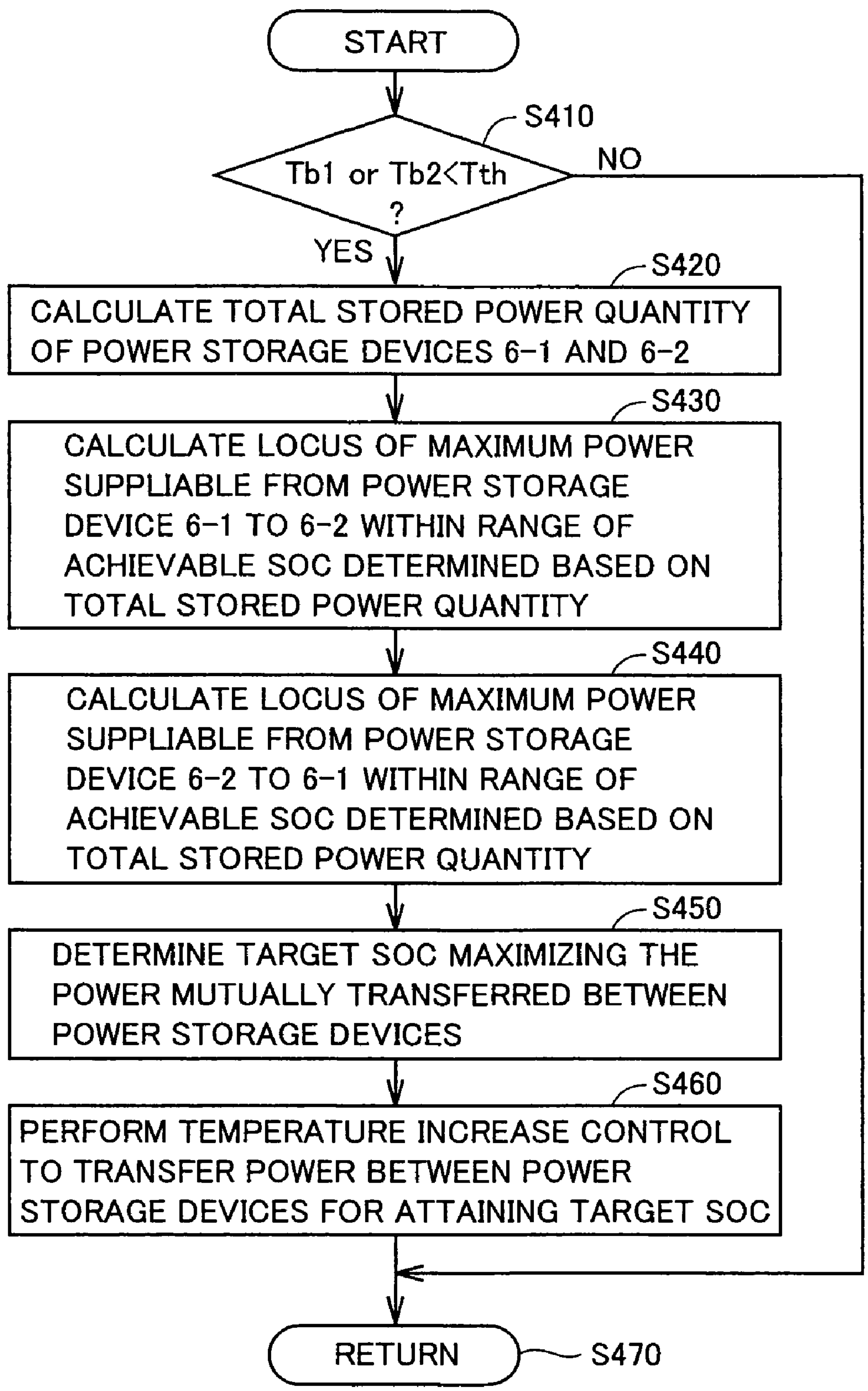
FIG. 12 is a flowchart illustrating a control structure of a temperature increase control unit in the third embodiment.

FIG. 12 is a flowchart illustrating a control structure of a temperature increase control unit 44B in the third embodiment. The processing shown in this flowchart is likewise called for execution from a main routine at predetermined intervals or when a predetermined condition is satisfied.

Referring to FIG. 12, temperature increase control unit 44B determines whether temperature Tb1 or Tb2 is lower than preset threshold temperature Tth or not (step S410). When temperature increase control unit 44B determines that both temperatures Tb1 and Tb2 are equal to or higher than threshold temperature Tth (NO in step S410), it advances the processing to a step S470.

When temperature increase control unit 44B determines that temperature Tb1 or Tb2 is lower than threshold temperature Tth (YES in step S410), it calculates a total stored power quantity P of power storage devices 6-1 and 6-2 based on the following equation (step S420):

$$P=PWh1\times SOC1+PWh2\times SOC2 \quad (22)$$

where PWh1 and PWh2 indicate the capacitances of power storage devices 6-1 and 6-2, respectively.

Then, temperature increase control unit 44B calculates the locus (curve k1) of the maximum power suppliable from power storage device 6-1 to power storage device 6-2 within the range of the achievable SOC that is determined based on total stored power quantity P, using the electric power table (step S430). Further, temperature increase control unit 44B calculates the locus (curve k2) of the maximum power suppliable from power storage device 6-2 to power storage device 6-1 within the range of the achievable SOC that is determined based on total stored power quantity P, using the electric power table (step S440).

Then, temperature increase control unit 44B obtains the operation point (Pmax) where the sum of the maximum power suppliable from power storage device 6-1 to power storage device 6-2 and the maximum power suppliable from power storage device 6-2 to power storage device 6-1 attains the maximum, and determines the SOC corresponding to the obtained operation point as the target SOC. Thus, temperature increase control unit 44B determines, as the target SOC, the SOC of each power storage device corresponding to the operation point (Pmax) where the power mutually transferred between power storage devices 6-1 and 6-2 attains the maximum (step S450).

Temperature increase control unit 44B actually executes the temperature increase control (step S460) by controlling converters 8-1 and 8-2 so that the electric power in the direction approaching the target SOC thus determined is transferred between power storage devices 6-1 and 6-2. More specifically, when state quantity SOC1 is higher than the target SOC of power storage device 6-1 (i.e., when state quantity SOC2 is lower than the target SOC of power storage device 6-2), converters 8-1 and 8-2 are controlled to supply the power of (P12=Min(D1, C2)) from power storage device 6-1 to power storage device 6-2. Conversely, when state quantity SOC1 is lower than the target SOC of power storage device 6-1 (i.e., when state quantity SOC2 is higher than the target SOC of power storage device 6-2), converters 8-1 and 8-2 are controlled to supply the power of (P21=Min(C1, D2)) from power storage device 6-2 to power storage device 6-1.

According to the fourth embodiment, as described above, the charge/discharge of power storage devices 6-1 and 6-2 is controlled so that the target SOC maximizing the power mutually transferred between power storage devices 6-1 and 6-2 may approach the target SOC, within the range of the achievable SOCs of power storage devices 6-1 and 6-2 that are determined based on total stored power quantity P of power storage devices 6-1 and 6-2. Accordingly, the fourth embodiment can actively and rapidly increase the temperatures of power storage devices 6-1 and 6-2. Consequently, a desired drive performance can be ensured early after the start of the vehicle system even when the temperature was low.

In each of the embodiments already described, the processing performed by the temperature increase control unit is actually performed by a CPU (Central Processing Unit). The CPU reads from a ROM (Read Only Memory) the program for executing the processing represented in the foregoing function blocks and the flowcharts, and executes the read program to execute the processing according to the foregoing function blocks and the flowcharts. Therefore, the ROM corresponds to a computer-readable (CPU-readable) recording in the foregoing function blocks and the flowcharts.

In the above description, power supply system 1 includes two power storage devices 6-1 and 6-2 as well as converters 8-1 and 8-2 corresponding to them, respectively. However, the system may include more power storage devices and converters corresponding to them, respectively, in which case the temperature increase control can be implemented in the foregoing manner by arbitrarily selecting two power storage devices and corresponding converters.

In the description already made, each of main positive bus line MPL and main negative bus line MNL corresponds to a "power line" in the invention, and converter ECU 2 corresponds to a "control device" in the invention.

Although the present invention has been described and illustrated in detail, it is clearly understood that the same is by way of illustration and example only and is not to be taken by way of limitation, the scope of the present invention being interpreted by the terms of the appended claims.

The invention claimed is:

1. A power supply system capable of supplying an electric power to a load device, comprising:

first and second chargeable power storage devices;

a power line configured to transfer electric power between the power supply system and said load device;

a first converter provided between said first chargeable power storage device and said power line, the first converter performs voltage conversion between said first chargeable power storage device and said power line;

a second converter provided between said second chargeable power storage device and said power line, the second converter performs voltage conversion between said second chargeable power storage device and said power line; and a control device that controls said first and second converters, wherein said control device determines (1) a maximum electric power transferable between said first and second chargeable power storage devices via said power line and (2) a transfer direction of the electric power based on an allowable discharge power and an allowable charge power of each of said first and second chargeable power storage devices, and the control device controls said first and second converters to transfer the determined maximum electric power between said first and second chargeable power storage devices.

2. The power supply system according to claim 1, wherein said control device determines the allowable discharge power and the allowable charge power of the first chargeable power storage device based on a state of charge and a temperature of said first chargeable power storage device, and the control device determines the allowable discharge power and the allowable charge power of said second chargeable power storage device based on a state of charge and a temperature of said second chargeable power storage device.

3. The power supply system according to claim 1, wherein when supply of the electric power to said load device is required, said control device determines (1) the maximum electric power transferable between said first and second chargeable power storage devices, (2) the transfer direction of the electric power based on said allowable discharge power and said allowable charge power and (3) the required electric power of said load device.

4. A vehicle comprising:

the power supply system according to claim 1; and a drive power generating unit receiving the electric power from said power supply system and generating a drive power of the vehicle.

5. A power supply system capable of supplying an electric power to a load device, comprising:

first and second chargeable power storage devices;

a power line configured transfer an electric power between the power supply system and said load device;

a first converter provided between said first chargeable power storage device and said power line, the first converter performs voltage conversion between said first chargeable power storage device and said power line;

a second converter provided between said second chargeable power storage device and said power line, the second converter performs voltage conversion between said second chargeable power storage device and said power line; and a control device controlling said first and second converters, wherein said control device determines a transfer direction of the electric power transferred between said first and second chargeable power storage devices via said power line based on a heating value during discharging and a heating value during charging of each of said first and second chargeable power storage devices, and the control device controls said first and second converters to transfer the electric power between said first and second chargeable power storage devices in the determined transfer direction.

6. The power supply system according to claim 5, wherein said control device determines said transfer direction to maximize a sum of the heating values of said first and second chargeable power storage devices.

7. The power supply system according to claim 5, wherein when a temperature of one of said first and second chargeable power storage devices is increased, said control device determines said transfer direction to maximize the heating value of the one of the first and second chargeable power storage devices having the increased temperature, based on the heating value during the discharging and the heating value during the charging of the one of the first and second chargeable power storage devices having the increased temperature.

8. A power supply system capable of supplying an electric power to a load device, comprising:

first and second chargeable power storage devices;

a power line configured to transfer an electric power between the power supply system and said load device;

a first converter provided between said first chargeable power storage device and said power line, the first converter performs voltage conversion between said first chargeable power storage device and said power line;

a second converter provided between said second chargeable power storage device and said power line, the second converter performs voltage conversion between said second chargeable power storage device and said power line; and a control device that controls said first and second converters, wherein said control device calculates a state of charge maximizing the electric power mutually transferred between said first and second chargeable power storage devices within a range of an achievable state of the charge of said first and second chargeable power storage devices determined based on a total quantity of the stored powers of said first and second chargeable power storage devices, and the control device controls said first and second converters to transfer, between said first and second chargeable power storage devices, the electric power in the direction approaching the calculated state of the charge.

9. A temperature increase control method for a power storage device in a power supply system capable of supplying an electric power to a load device, said power supply system including first and second chargeable power storage devices, a power line configured to transfer an electric power between the power supply system and said load device, a first converter provided between said first chargeable power storage device and said power line, the first converter performs voltage conversion between said first chargeable power storage device and said power line, and a second converter provided between said second chargeable power storage device and said power line, the second converter performs voltage conversion between said second chargeable power storage device and said power line, said temperature increase control method comprising:

determining a maximum electric power transferable between said first and second chargeable power storage devices via said power line and determining a transfer direction of the electric power based on an allowable discharge power and an allowable charge power of each of said first and second chargeable power storage devices; and controlling said first and second converters to transfer the determined maximum electric power between said first and second chargeable power storage devices.

10. A non-transitory computer-readable recording medium bearing a program for causing a computer to execute the temperature increase control method according to claim 9.

11. A temperature increase control method for a power storage device in a power supply system capable of supplying an electric power to a load device, said power supply system including first and second chargeable power storage devices, a power line configured to transfer an electric power between the power supply system and said load device, a first converter provided between said first power storage device and said power line, the first converter performs voltage conversion between said first chargeable power storage device and said power line, and a second converter provided between said second chargeable power storage device and said power line, the second converter performs voltage conversion between said second chargeable power storage device and said power line, said temperature increase control method comprising:

determining a transfer direction of the electric power transferred between said first and second chargeable power storage devices via said power line based on a heating value during discharging and a heating value during charging of each of said first and second chargeable power storage devices; and controlling said first and second converters to transfer the electric power between said first and second chargeable power storage devices in the determined transfer direction.

12. A temperature increase control method for a power storage device in a power supply system capable of supplying an electric power to a load device, said power supply system including first and second chargeable power storage devices, a power line configured to transfer an electric power between the power supply system and said load device, a first converter provided between said first chargeable power storage device and said power line, the first converter performs voltage conversion between said first chargeable power storage device and said power line, and a second converter provided between said second chargeable power storage device and said power line, the second converter performs voltage conversion between said second chargeable power storage device and said power line, said temperature increase control method comprising:

calculating a total quantity of the stored powers of said first and second chargeable power storage devices;

calculating a state of charge maximizing the electric power mutually transferred between said first and second chargeable power storage devices within a range of an achievable state of the charge of said first and second chargeable power storage devices determined based on the calculated total quantity of the stored powers of the first and second chargeable power storage devices; and controlling said first and second converters to transfer, between said first and second chargeable power storage devices, the electric power in a direction approaching the calculated state of the charge.

* * * * *